Patented Sept. 13, 1949

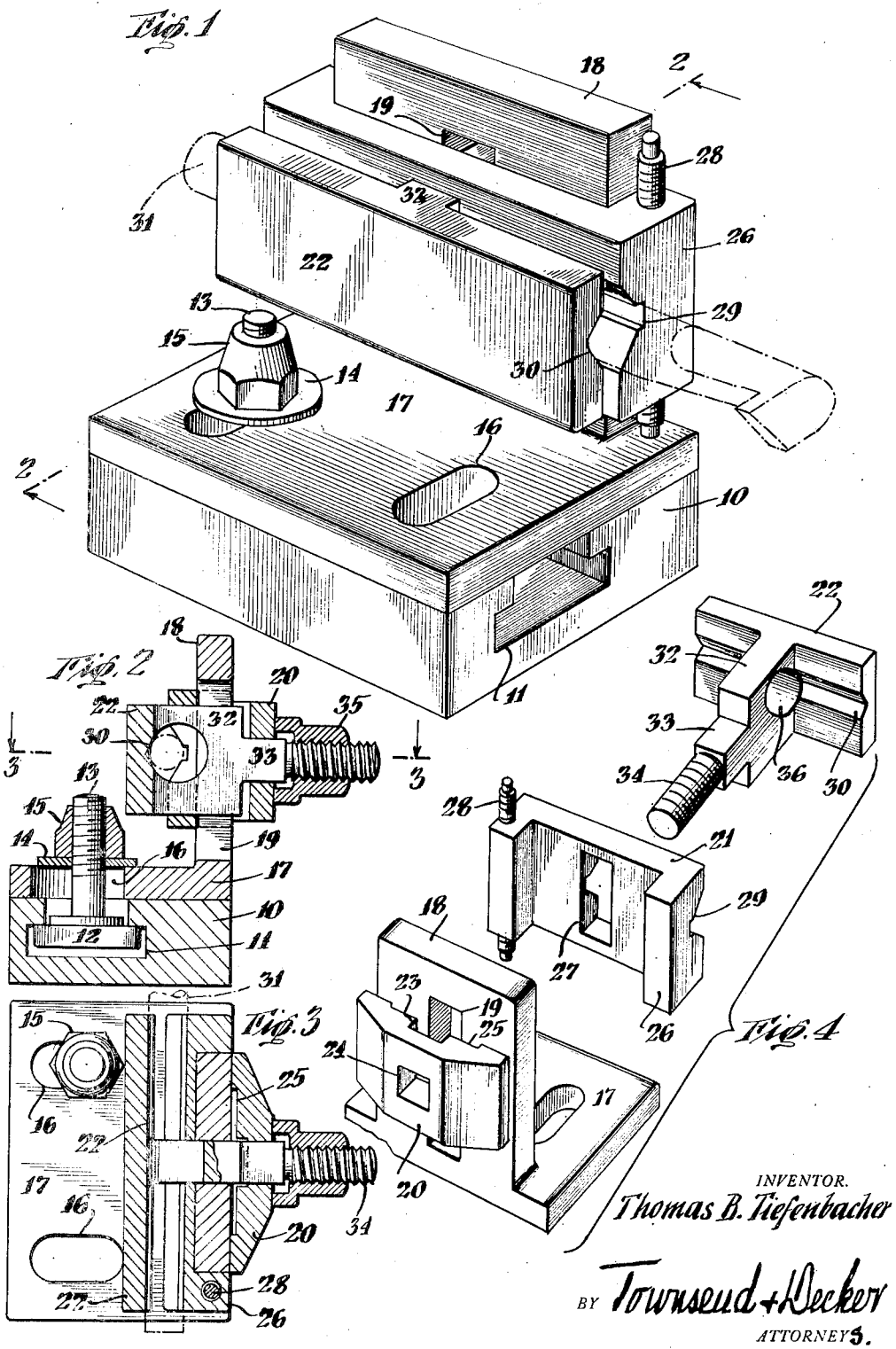

2,482,041

UNITED STATES PATENT OFFICE 2,482,041

TOOLHOLDER

Thomas B. Tiefenbacher, Jamaica, N. Y.; Lila Grinka executrix of said Thomas B. Tiefenbacher, deceased Application August 22, 1946, Serial No. 692,249

2 Claims. (Cl. 82—36)

This invention has for its principal object the production of a tool-holder or tool-post of simple construction for use in conjunction with any suitable machine as a lathe and the like and adapted to hold a tool or other object and to firmly clamp it in a predetermined working position. The invention is an improvement on the device of my prior Patent No. 2,136,091 dated November 8, 1938.

The invention provides for improved and simplified means for preventing relative movement of the parts making up the clamping device for the tool to be held and for insuring accuracy in the adjustment of the position of those parts whereby the tool will be held and firmly clamped in the exact and precise predetermined position desired.

A further object of the invention is the production of simple and improved means for adjustably holding as a unit the clamping elements of the tool-holder in any given vertical position before being drawn together and finally tightened into clamping position.

Other specific advantages and results accomplished in the construction of the tool-holder of the present invention over the construction of that of the patented device will become apparent as the description thereof proceeds.

The invention consists in the novel tool-holder or tool-post hereinafter more particularly described and then specified in the claims, a practical embodiment of the invention being illustrated in the accompanying drawing in which:

Fig. 1 is a perspective view of the tool-holder or tool-post of the invention.

Fig. 2 is a section on the line 2—2 of Fig. 1.

Fig. 3 is a horizontal section on the line 3—3 of Fig. 2.

Fig. 4 is an exploded perspective view of various of the parts of the device.

Referring in detail to the several figures of the drawing:

A suitable horizontally extending supporting block is indicated at 10 and it may be the compound or any other supporting part of a lathe or analogous machine or apparatus. Said supporting block is preferably provided with an inverted T-slot 11 receiving the head 12 of a bolt 13 the screw-threaded end of which carries a washer 14 and tightening nut 15 which is detachably screwed thereon. The shank of the bolt is selectively passed through one of a plurality of slots 16 with which the horizontal or supporting base 17 of an L-bar or right-angled bar forming the body of the holder is provided. The vertical member or upright of said body 17 is indicated at 18 and it is preferably integral with said base or body 17. Said vertical member is provided with a rectangular slot 19 extending therethrough and preferably positioned centrally thereof.

The clamping elements of the tool-holder comprise an inner clamping plate 20, an intermediate clamping plate 21 and an outer clamping plate 22. Said inner clamping plate is provided with a squared groove 23 and a squared slot 24 extending therethrough and intersecting said groove and said groove and slot register with the aforesaid slot 19 in the vertical member 18. The inner clamping face of said inner clamping plate 20 which, when in clamping position, engages a face of the vertical member 18 is preferably chamfered, as at 25, and at either side of the groove 23, to compensate for dirt or grease which might accumulate on said clamping face and interfere with the proper and tight clamping action of said plate 20 against the vertical member 18.

The intermediate clamping plate 21 is provided with right-angled end flanges 26 adapted to slidably engage the sides of the vertical member 18 and said plate is also provided with a rectangular slot 27 extending therethrough and registering with the slot 19 in said vertical member. One of said flanges 26 carries a vertically extending set-screw 28 threaded through a screw-threaded opening in said flange, the lower end of said set-screw being adapted to engage the horizontal member or base 17. The free outer face of said intermediate clamping plate 21 is horizontally V-grooved as at 29.

The outer clamping plate 22 is horizontally V-grooved as at 30 for cooperation with the V-groove 29 for supporting and gripping in clamped position any suitable and desired tool 31 between clamping plates 21 and 22 as shown in Fig. 1. Said clamping plate 22 is provided with a forwardly extending rectangular supporting body 32 which is adapted to extend through slot 27 and into groove 23 and to interfit with said slot and groove when the clamping elements are drawn into clamping position. When in that position said body 32 also extends through slot 19 in the vertical member 18 and slidably engages the side walls of said slot so as to be vertically movable therein. Said body 32 is shouldered as at 33 to provide a squared extension adapted to be received by and to interfit with slot 24 in clamping plate 20. A screw-threaded bolt projects from and is secured to extension 33 and is indicated by numeral 34. Said bolt removably receives a hollow nut 35 which bears against the clamping plate 20 and spans the slot 24 when the nut is screwed "home" to draw the clamping elements into clamping position. The rectangular body 32 is also provided with a bore 36 extending transversely therethrough which merges with the groove 30 which receives and supports the tool 31 while it is being clamped in the desired predetermined position.

It will be obvious from the foregoing description that when the parts of the holder are properly assembled together the outer clamping plate 22 or more specifically the body 32 and squared extension 33 thereof carry and support the intermediate clamping plate 21 and inner clamping plate 20 respectively and because of the interfitting engagement of the parts no relative rocking or horizontal movement of one clamping plate with respect to another is possible. Relative rocking of the intermediate clamping plate 21 or horizontal movement thereof with respect to the vertical member 18 also is not possible because of the close sliding engagement of the flanges 26 with the sides of the vertical member.

For clamping the tool 31 in desired position, the nut 35 on screw-threaded bolt 34 is considerably loosened to permit separation of clamping plates 21 and 22 and the tool 31 is then extended through the bore 36 the proper predetermined distance after which the clamping plates are drawn together sufficiently tightly and by manipulation of the nut 35 to hold said tool 31 intermediate clamping plates 21 and 22 and in grooves 29 and 30 but not tightly enough, however, to prevent slidable vertical movements of the clamping plates as a unit within the slot 19 in the vertical member or upright 18. The adjustable set-screw 28 may then be manipulated in the proper direction to raise or lower, as the case may be, the clamping plates as a unit, and in consequence the tool 31, to the proper and desired vertical position. Manifestly, this vertical adjustment may be effected without the necessity of gripping the clamping plates bodily and holding them in the desired vertical position until the final clamping operation has been brought about as they are supported and prevented from sliding downward movement on the vertical member 18 by the set-screw 28. Said set-screw also permits of the adjustment of the vertical position of the clamping plates to a fine degree and after the proper position has been secured the nut 35 is screwed "home" tightly against the inner clamping plate 20 to effect an extremely tight and rigid clamping of the tool 31 in both its desired vertical and horizontal positions.

In actual practice the working or cutting end of the tool 31 usually lies at the left of the operator as he faces the machine with the set-screw 28 extending through that flange 26 of clamping plate 21 which lies adjacent said working end. These parts are shown in reversed position in the drawing, however, merely for the sake of illustration and to emphasize the fact, as shown in Fig. 1, that the lower end of the set-screw 28 bears against the base 17.

As is obvious, the relative positions of the clamping plates with respect to the upright 18 are reversible, that is to say, clamping plates 21 and 22 may be positioned on the side or adjacent the face of upright 18 presently occupied by clamping plate 20 and the latter plate occupy the position of plates 21 and 22. When reversing the position of intermediate clamping plate 21, however, it is desirable that set-screw 28 shall always be positioned at that side of the upright lying adjacent the working or cutting end of tool 31 as the set-screw which bears against the base 17 as has hereinbefore been explained will then absorb some of the strain to which the working end of the tool is subjected when in operation.

The invention claimed is:

1. In a tool-holder, a vertically extending upright member having a slot therein, a horizontally extending base connected to said upright member, an inner clamping plate having a groove and a slot therein, an intermediate clamping plate provided with a slot registering with the slots in said upright member and inner clamping plate, an outer clamping plate movable independently of said intermediate clamping plate and adapted to co-operate with said intermediate clamping plate for clamping a tool therebetween by the application of lateral pressure exerted against said tool longitudinally thereof, a body portion on said outer clamping plate extending through and interfitting with the slots in said intermediate clamping plate and said upright member and slidable vertically in the slot in said upright member, said body portion also engaging and interfitting with the groove in said inner clamping plate, an extension on said body portion extending through and interfitting with the slot in said inner clamping plate, means on said extension for drawing all of said clamping plates toward said upright member and into clamping position and a screw-threaded bolt threaded through said intermediate clamping plate and having one end engaging said horizontally extending base and the other end protruding above said intermediate clamping plate and accessible for manipulation whereby the vertical position of all of said clamping plates as a unit may be adjusted and maintained.

2. In a tool-holder, a vertically extending upright member having a slot therein, a horizontally extending base connected to said upright member, an inner clamping plate having a slot therein, an intermediate clamping plate provided with a slot registering with the slots in said upright member and inner clamping plate, flanges on said intermediate clamping plate slidably engaging the sides of said upright member, an outer clamping plate movable independently of said intermediate clamping plate and adapted to co-operate with said intermediate clamping plate for clamping a tool having a cutting end between said plates by the application of lateral pressure exerted against said tool longitudinally thereof, a body portion on said outer clamping plate extending through and interfitting with the slots in said intermediate clamping plate and said upright member and slidable vertically in the slot in said upright member, an extension on said body portion extending through and interfitting with the slot in said inner clamping plate, means on said extension for drawing all of said clamping plates into clamping position and an adjustable screw-threaded bolt threaded through the flange on said intermediate clamping plate which lies adjacent the cutting end of the clamped tool and having one end engaging said horizontally extending base and the other end protruding above said intermediate clamping plate and accessible for manipulation whereby the vertical position of all of said clamping plates as a unit may be adjusted and maintained.

THOMAS B. TIEFENBACHER.

REFERENCES CITED

The following references are of record in the file of this patent:

UNITED STATES PATENTS

| Number | Name | Date |
|---|---|---|
| 916,618 | Seil | Mar. 30, 1909 |
| 1,332,731 | Krieger | Mar. 2, 1920 |
| 2,136,091 | Tiefenbacher | Nov. 8, 1938 |
| 2,389,858 | Kyle | Nov. 27, 1945 |